United States Patent [19]

Giard, Jr.

[11] Patent Number: 5,033,325
[45] Date of Patent: Jul. 23, 1991

[54] ADJUSTABLE CONNECTION FOR BICYCLE HANDLEBAR

[75] Inventor: Edward H. Giard, Jr., Oak Park, Ill.

[73] Assignee: Profile for Speed, Inc., Chicago, Ill.

[21] Appl. No.: 538,664

[22] Filed: Jun. 15, 1990

[51] Int. Cl.⁵ .................................. B62K 21/16
[52] U.S. Cl. ..................... 74/551.3; 74/551.1;
74/551.8; 403/297; 280/298
[58] Field of Search ............... 74/551.1, 551.3, 551.4,
74/551.6, 551.8, 551.9; 403/295, 297, 171, 176;
280/278, 287

[56] References Cited

U.S. PATENT DOCUMENTS

| 575,936 | 1/1897 | Roso | 74/551.8 X |
| 2,487,661 | 11/1949 | McCauley, Jr. | 74/551.6 |
| 3,863,521 | 2/1975 | Gatsos et al. | 74/551.4 |
| 4,274,301 | 6/1981 | Katayama | 74/551.1 |
| 4,322,087 | 3/1982 | Addicks | 74/551.1 X |
| 4,337,962 | 7/1982 | Allen et al. | 74/551.1 X |
| 4,361,057 | 11/1982 | Kochera | 74/551.4 |
| 4,417,745 | 11/1983 | Shomo | 74/551.4 X |
| 4,505,609 | 3/1985 | Vella | 403/297 X |
| 4,878,397 | 11/1989 | Lennon | 74/551.9 X |

FOREIGN PATENT DOCUMENTS 0911073 7/1946 France ........................ 74/551.1

Primary Examiner—Vinh T. Luong
Assistant Examiner—Winnie Yip
Attorney, Agent, or Firm—Kinzer, Plyer, Dorn McEachran & Jambor

[57] ABSTRACT

A linkage for attaching an auxiliary handlebar having tubular ends to a bicycle handlebar having tubular ends includes a first member adapted to be axially secured and rotationally movable within each tubular end of the auxiliary handlebar and an adjustable linkage adapted to be variably positioned within each tubular end of the bicycle handlebar. Each adjustable linkage is pivotally attached to a first member in mounting the auxiliary handlebar to the bicycle handlebar.

9 Claims, 1 Drawing Sheet

5,033,325

ADJUSTABLE CONNECTION FOR BICYCLE HANDLEBAR

SUMMARY OF THE INVENTION

The present invention relates to bicycle handlebars, and in particular to a means for attaching an auxiliary handlebar to the conventional handlebar of a bicycle.

A primary purpose of the invention is an attachment as described which provides for adjustment along a plurality of axes so that the auxiliary handlebar can be attached to bicycle handlebars of different sizes and configurations.

Another purpose is a linkage for use in attaching an auxiliary handlebar to a bicycle handlebar which is simple in construction and reliably operable.

Another purpose is a linkage of the type described which permits adjustment about different axes when attaching the auxiliary handlebar to the main handlebar of the bicycle.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

It is becoming common in the bicycle industry to provide what are termed "auxiliary" handlebars which can attach to the main handlebar of a bicycle and, when used, provide the rider with a more aerodynamic profile. Normally, such auxiliary handlebars are used on racing-type bicycles, but there are other types of bicycles in which the rider may well desire to have an auxiliary handlebar to provide a different steering area and a more aerodynamic profile.

The present invention provides an auxiliary handlebar which can be connected to the conventional handlebar of what is characterized in the trade as a trail bike. A trail bike is one having a more rugged construction and different types of tires and is customarily used by riders on rough trails, for example those found in mountains or rural areas. The present invention is very specifically directed to a linkage which is used to adapt an auxiliary handlebar to the conventional handlebar of a trail bike.

Figure 1:
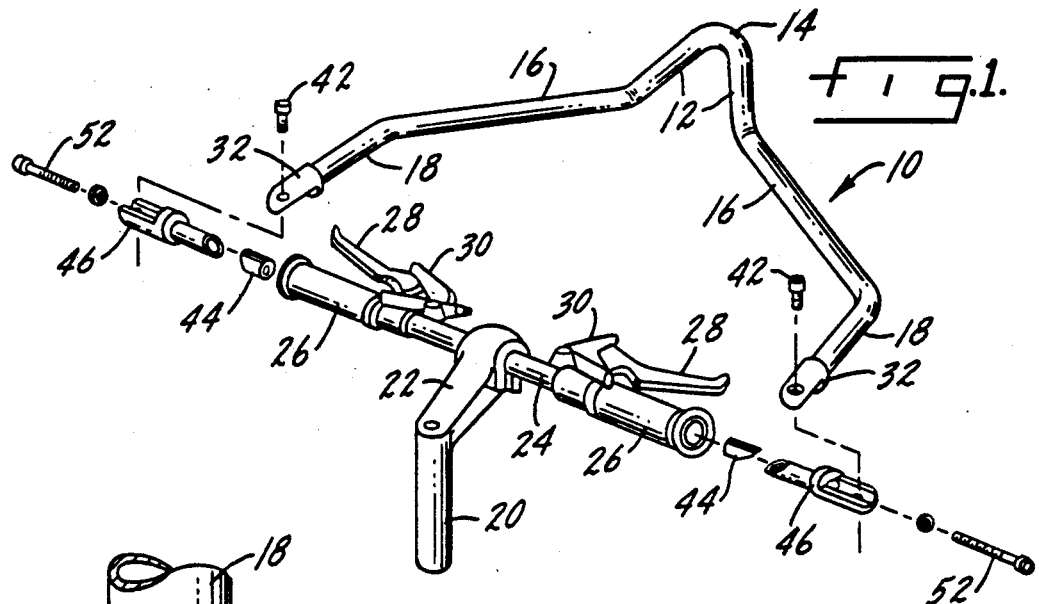
FIG. 1 is an exploded perspective illustrating the means for attaching an auxiliary handlebar to a bicycle handlebar disclosed herein.
Figure 2:
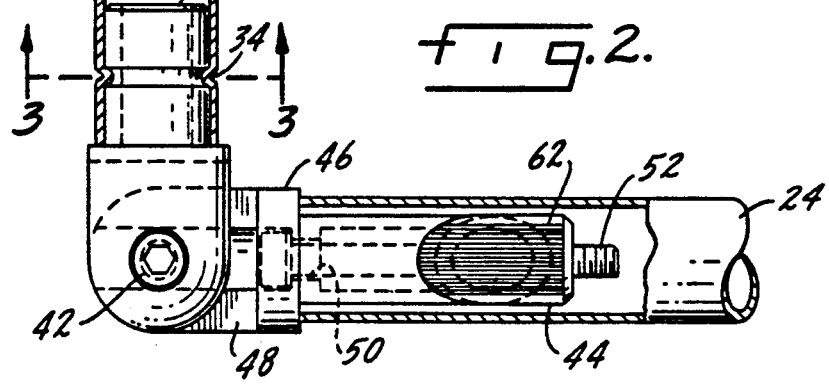
FIG. 2 is an enlarged partial section illustrating the attachment linkage.
Figure 3:
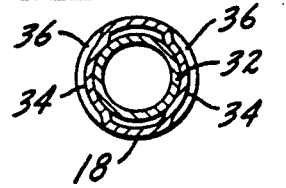
FIG. 3 is a section along plane 3—3 of FIG. 2.
Figure 5:
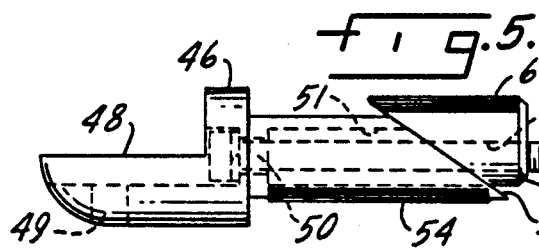
FIG. 5 is a side view of a wedge link.
Figure 4:
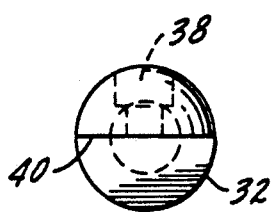
FIG. 4 is an end view of one member of the linkage.
Figure 6:
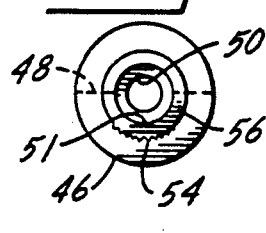
FIG. 6 is an end view of the wedge link.
Figures 7, 8:
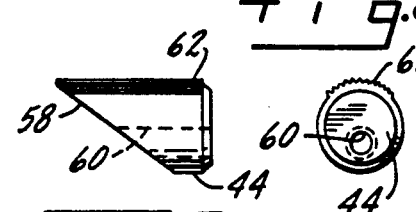
FIG. 7 is a side view of the wedge member.
FIG. 8 is an end view of the wedge member.

In FIG. 1, an auxiliary handlebar is indicated at 10 and is of the type manufactured by Profile For Speed, Inc. and sold under the trademark "XCR". Handlebar 10 has upturned forward sections 12 which can be used as a steering control by the rider, with the sections 12 being joined by a loop 14. Each section 12 is joined to a forwardly and inwardly extending section 16, with each section 16 being joined to rear sections 18. The entire auxiliary handlebar 10 may be formed of hollow tube, but for the purposes of the attaching device of the present invention, only the ends need to be tubular.

The front wheel post of the bicycle is indicated at 20 and has a forwardly extending section 22 which mounts the conventional handlebar 24 of a trail bike. Handlebar 24 may have hand grips 26, brake controls 28 and shift levers 30, all of these items being conventional on trail bikes. Handlebar 24 may be tubular, but for purposes of the attachment linkage of the present invention, only the ends need to be tubular.

In use, the rider may steer by means of hand grips 26 in the conventional way. The rider may lean over the front of handlebar 24, and assume an aerodynamic profile conventional in racing, and grip the auxiliary handlebar in the inwardly slanted sections 16, the upwardly and inwardly slanted sections 12 or at the rear sections 18. Although not shown, arm rests may be placed on handlebar 24, if desired.

The specific linkage which adapts the auxiliary handlebar to the main handlebar is shown in FIGS. 2-8. A first member or stake member is indicated at 32 and is tubular in form and extends within the hollow end section 18 of the auxiliary handlebar. Section 18 may be staked, as at 34, to hold the stake member 32 in an axial position, while permitting 360° rotational movement of the stake member. The staking is particularly illustrated in FIG. 3 and may have a substantial circumferential extent, as indicated at 36. Stake member 32 has an opening 38 and a downwardly-facing recess 40 which will enable the stake member to be cooperatively pivotally connected to the remaining portions of the linkage. The connection is made by a cap screw 42 which will pass through opening 38 and be threadedly engaged with the wedged linkage as described hereinafter.

The stake member comprises one portion of the linkage. The other portion is formed by a wedge member 44 and a wedge link 46. Wedge link 46 has an upwardly-facing recess 48 which is used to cooperatively engage the wedge link with the stake member. The wedge link has a centered bore 50, with an enlarged area 51, which will receive a fastener 52 which is used to connect the wedge link with wedge member 44. Wedge link 46 may have a portion of its exterior surface, indicated at 54, knurled or otherwise roughened, so that it will grip the interior of the tubular ends of bicycle handlebar 24. Wedge link 46 has a slanted end face 56 which faces a mating slanted end face 58 of wedge member 44. The wedge member has an off center bore 60 and may have a portion of its exterior surface knurled, as at 62, again to grip the interior of the tubular ends of handlebar 24.

In assembling the auxiliary handlebar to bar 24, the first step is to threadedly engage each wedge member 44 with its associated wedge link using fastener 52. These connections are loose. The wedge linkage made up of those two members is then inserted into the tubular ends of bar 24. The distance is adjustable, but once the proper position has been determined, the fastener is turned until the mating faces 56 and 58 are in contact. As the fastener is tightened, due to the enlarged bore 51 of the wedge link and the off center position of bore 60 in the wedge member, the wedge member will move up the slanted face 56 of the wedge link until the exterior surface of the wedge member is in firm contact with the interior of the tubular end of the bar. The cooperating slanted faces permit the linkage to be used in bars of varying internal diameter. The knurled surfaces on the wedge member and wedge link will be in contact with opposite sides of the tubular end of the bar and will grip the interior of the bar.

The stake members are axially fixed within the auxiliary handlebar, but they may be rotated. In assembly, the stake members are aligned with the wedge linkage at each end of bar 24 and fasteners 42 are threaded through the aligned and opposing openings 38 and 49. As the fasteners 42 are threaded into the opening in each wedge link, any necessary rotary movement of each stake member will be brought about as the fasteners are tightened down. The linkage thus has adjustable movement along several axes. Stake member 32 is rotatable about its axis. There is a pivotal adjustment between the stake member and the wedge link. The wedge link may be variably axially positioned within the tubular ends of bar 24 and the wedge linkage may be variably rotationally positioned within the tubular end of the bar. All of these adjustments are necessary to accommodate different sizes and configurations of handlebars. As shown herein, bar 24 is straight, but some trail bike handlebars are slanted rearwardly, at times forwardly, or either up or down. The linkage described herein can accommodate all such different configurations of handlebars.

Of importance in the invention are the multiples types of adjustment, as well as the knurled exterior on the wedge linkage which provides a positive and firm method of securing the wedge link to the tubular ends of the handlebar.

Whereas the preferred form of the invention has been shown and described herein, it should be realized that there may be many modifications, substitutions and alterations thereto.

The embodiments of the invention in which an exclusive property or privilege is claimed are defined as follows:

1. In combination with a bicycle primary handlebar, a means attaching an auxiliary handlebar having a pair of tubular ends to said bicycle primary handlebar having tubular ends, said attaching means including a first member axially secured and rotationally movable within each tubular end of the auxiliary handlebar, and an adjustable linkage having a first end axially and rotationally, variably positioned with each tubular end of the bicycle primary handlebar, each adjustable linkage having a second end pivotally connected to each of the first members mounting the auxiliary handlebar to the bicycle primary handlebar.

2. The attaching means of claim 1 further characterized in that each first member is staked within one of the tubular ends of the auxiliary handlebar to prevent axial movement, but permit rotationally movement.

3. The attaching means of claim 1 further characterized in that the pivotal connection between each first member and each adjustable linkage includes a pair of aligned openings in the respective first members and adjustable linkages and a fastener extending through said aligned openings.

4. The attaching means of claim 1 further characterized in that each adjustable linkage includes a wedge member at said first end and a wedge link at said second end, and a fastener adjustably connecting said wedge member and wedge link.

5. The attaching means of claim 4 further characterized in that each wedge member and each associated wedge link have cooperating and mating slanted surfaces for variably axially positioning the wedge member relative to the wedge link.

6. The attaching means of claim 5 further characterized in that each wedge member and wedge link have bores for the associated fastener, with the bore of one of said members being off center, whereby each wedge member may be adjustably radially positioned within each bicycle primary handlebar tubular end.

7. The attaching means of claim 6 further characterized in that the bore of each wedge link is centered, and larger than the wedge member bore, and the bore of each wedge member is off center.

8. The attaching means of claim 5 further characterized in that an exterior surface of each wedge member has a gripping area for use in engaging an interior surface of the tubular end of the bicycle primary handlebar.

9. The attaching means of claim 5 further characterized in that an exterior surface of each wedge link has a gripping area for use in engaging an interior surface of the tubular end of the bicycle primary handlebar.

* * * * *